United States Patent
Smith

[19]

[11] Patent Number: 5,819,411
[45] Date of Patent: Oct. 13, 1998

[54] AUTOMATIC INJECTOR INSERTION STATION

[75] Inventor: Dennis R. Smith, Williamsburg, Va.

[73] Assignee: Siemens Automotive Corporation, Auburn Hills, Mich.

[21] Appl. No.: 819,410

[22] Filed: Mar. 18, 1997

[51] Int. Cl.⁶ .................................................. B23P 19/02
[52] U.S. Cl. ........................................ 29/888.01; 29/214
[58] Field of Search ................................. 29/213.1, 214, 29/888.01

[56] References Cited

U.S. PATENT DOCUMENTS

| | | | |
|---|---|---|---|
| 4,715,013 | 12/1987 | Jaksa et al. .......................... | 29/888.01 |
| 4,829,646 | 5/1989 | Cigolotti et al. ..................... | 29/888.01 |
| 4,879,796 | 11/1989 | Nakamura et al. .................... | 29/214 |
| 5,097,579 | 3/1992 | Pringault ............................ | 29/214 |
| 5,189,782 | 3/1993 | Hickey .............................. | 29/602.1 |
| 5,317,911 | 6/1994 | Yaraschefski ....................... | 29/888.01 |
| 5,539,981 | 7/1996 | Burcham et al. ..................... | 29/888.01 |

FOREIGN PATENT DOCUMENTS

| | | | |
|---|---|---|---|
| 40 16 546 | 11/1991 | Germany ............................ | 29/888.01 |

*Primary Examiner*—Erick R. Solis

[57] ABSTRACT

An automatic injector insertion station for inserting a fuel injector mounting end into a fuel rail cup includes a housing and an injector nest moveable relative to the housing. The nest includes first and second ends. The first end includes a support for supporting and guiding the injector, and is moveable between a preload position, wherein the fuel injector mounting end is adjacent the fuel rail cup, and an insertion position, wherein the mounting end and o-ring are mounted in the fuel rail cup. A compression spring is mounted in the housing and connected with the second end of the injector nest. A piston and cylinder arrangement is operable for compressing the compression spring to a loaded compressed position. The injector nest is moveable by the compression spring compressive force from the preload position to the insertion position to assemble the fuel injector and o-ring into said fuel rail cup through linear spring force, thus preventing damage to the o-ring.

18 Claims, 3 Drawing Sheets

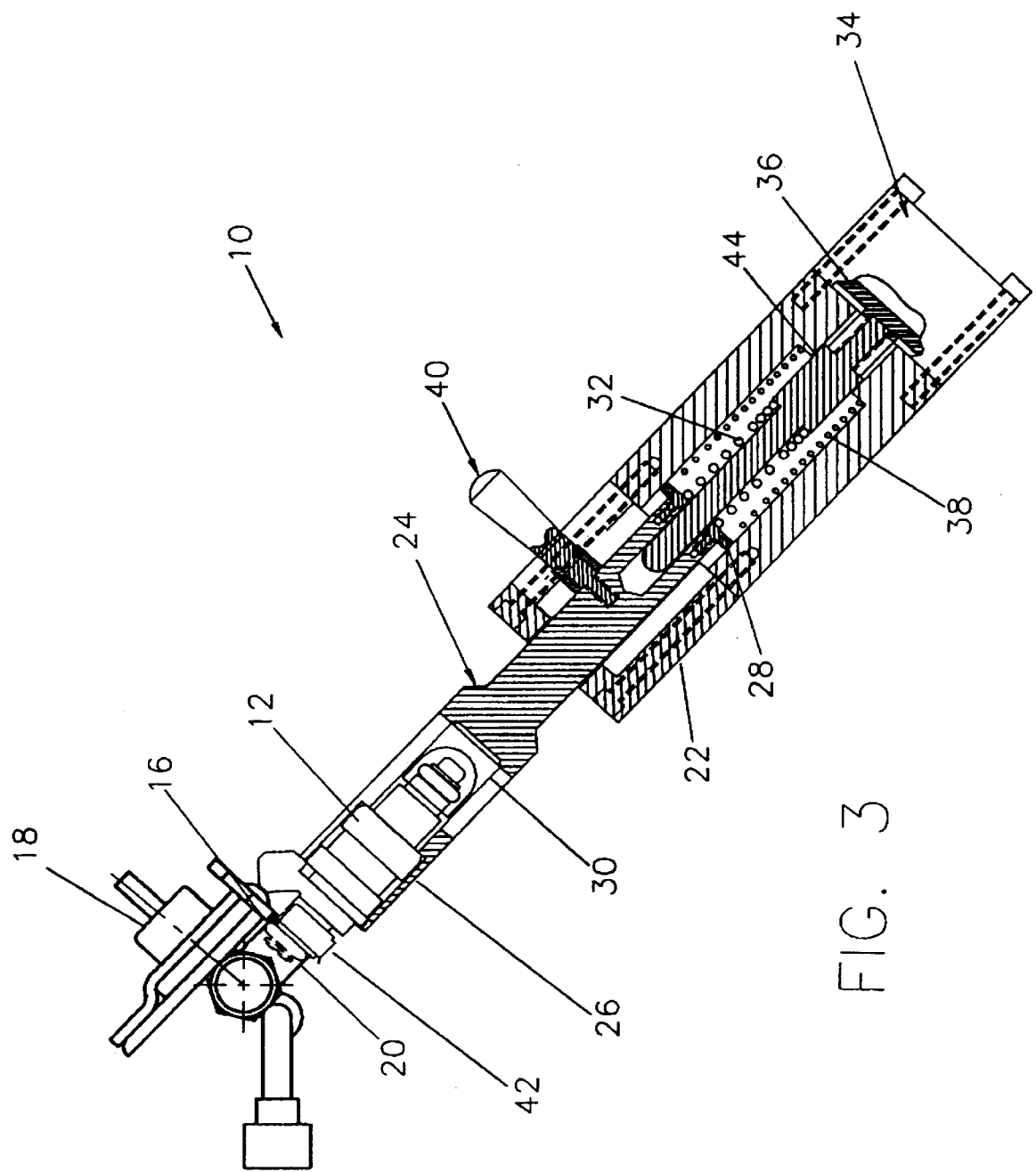

AUTOMATIC INJECTOR INSERTION STATION

FIELD OF THE INVENTION

This invention relates to a method and apparatus for assembling a fuel injector into a fuel rail and more specifically to the insertion of the mounting end of an injector into the fuel rail cup without damage to the o-ring.

BACKGROUND OF THE INVENTION

It is known in the art relating to fuel rail assembly to insert a fuel injector into a fuel rail cup and provide an o-ring between the injector and fuel rail cup wall to seal and prevent fuel from escaping outside the engine. Such assembly is critical and requires some compression of the o-ring without damaging or rolling the o-ring.

Prior art methods for inserting an injector into a fuel rail include a straight air insertion method and a hydraulic control insertion method for forcing the mounting end of the injection into the fuel rail using pneumatic or hydraulic force respectively. The straight air insertion method, and the inherent compressibility of air, is costly, lacks the ability to properly control the force applied to the injector to insert it into the fuel rail cup without damaging the o-ring and is easily altered. The hydraulic control method has improved force and speed control vis-a-vis the air insertion system, but is difficult to control at the low force range, i.e. low hydraulic pressure, and easily altered.

SUMMARY OF THE INVENTION

The present invention provides a method and apparatus for inserting a fuel injector into a fuel rail cup without damaging or rolling the o-ring seal used to prevent fuel from escaping.

The present invention also provides a method and apparatus for inserting a fuel injector into a fuel rail cup which limits the amount of force applied to the injector to insert the injector onto the fuel rail cup.

More specifically, a method of inserting a fuel injector having a mounting end including an o-ring for interferingly fitting and sealing into a fuel rail cup, comprises the steps of:

aligning the mounting end for insertion into the cup;

compressing a compression spring in communication with the injector; and transmitting the spring compressive force to the fuel injector to push the injector mounting end and o-ring into the fuel rail cup, urging the o-ring therein without damaging the o-ring.

Compressing the compression spring includes displacing an end thereof a predetermined distance by applying a force thereto such as that provided by a pneumatic or hydraulic piston and cylinder arrangement.

Aligning the injector mounting end may include preloading the injector o-ring against the fuel rail cup utilizing a preload spring pressure, prior to applying the compression spring force, to assure alignment during insertion. The preload spring may be retracted utilizing manual, pneumatic or hydraulic forces applied thereto, compressing the preload spring, without compressing the compression spring.

An automatic injector insertion station for inserting a fuel injector mounting end into a fuel rail cup as herein above described includes a housing and an injector nest moveable relative to the housing. The nest includes first and second ends. The first end includes a support for supporting and guiding the injector, and is moveable between a preload position, wherein the fuel injector mounting end is adjacent the fuel rail cup, and an insertion position, wherein the mounting end and o-ring are mounted in the fuel rail cup.

A compression spring is mounted in the housing and connected with the second end of the injector nest. A compression means is operable for compressing the compression spring to a loaded compressed position from which the compression spring moves the injector nest in an insertion or loading direction as it expands. The injector nest is thereby moveable by the compression spring compressive force from the preload position to the insertion position to assemble the fuel injector and o-ring into the fuel rail cup. In this fashion, the linear spring action of the compression spring is used to urge the o-ring into its mounted position in the fuel rail cup. This method limits the force applied to the injector during insertion and prevents damage to the o-ring.

In one embodiment, the automatic injector insertion station includes a guide for guiding and supporting the compression spring. This guide is connected to the compressing means which preferably includes a pneumatic or hydraulic piston and cylinder arrangement although an electrical or solenoid arrangement may be used.

A preload spring may also be mounted in the housing and connected with the second end of the injector nest. The preload spring is retractable through the application of retracting means, which may be mechanical, pneumatic, hydraulic or electrical, acting on the injector nest to move the injector nest to a retracted position. Releasing the retracting means allows the preload spring to move the injector nest forward toward the insertion position and seat the o-ring against the rim of the fuel rail cup in a preload position. Upon subsequent actuation of the compression means to compress the compression spring, the injector mounting end and o-ring are urged by the force of the compression spring into the fuel rail cup as the compression spring expands.

These and other features and advantages of the invention will be more fully understood from the following detailed description of the invention taken together with the accompanying drawings.

BRIEF DESCRIPTION OF THE DRAWINGS

In the drawings:

FIG. 3 is a sectional side view of the automatic injector insertion station of FIG. 1 showing a final insertion position of the station wherein the fuel injector has been assembled into the fuel rail cup.

DETAILED DESCRIPTION OF THE INVENTION

Figure 1:
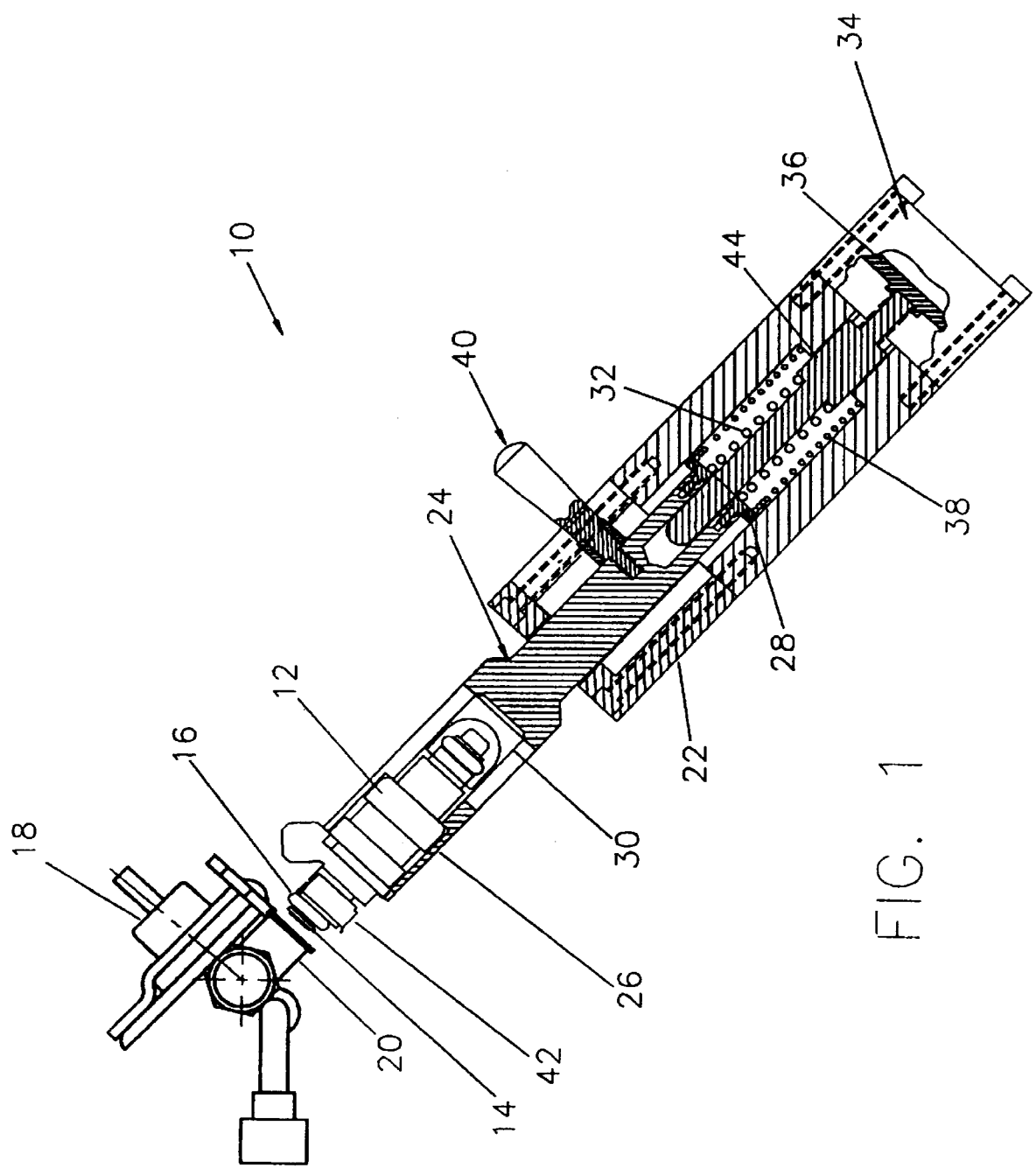
FIG. 1 is a sectional side view of an automatic injector insertion station constructed in accordance with the present invention and supporting a fuel injector therein ready to be assembled into a fuel rail cup in a retracted position of the station.

Referring now to the drawings in detail, numeral 10 generally indicates an automatic injector insertion station for assembling a fuel injector 12 having a mounting end 14 with an o-ring 16 seal into a fuel rail 18 having a fuel rail cup 20. As is hereinafter more fully described, the injector insertion station 10 uses linear spring pressure or force to urge the injector mounting end 14 and o-ring into the fuel rail cup 20, thereby limiting and controlling the force used, and preventing damage from occurring to the o-ring.

As is illustrated, the injector insertion station 10 includes a housing 22 and an injector nest 24 supported by and moveable relative to the housing. The nest includes first and second ends 26,28 respectively. The first end 26 includes a support 30 for supporting and guiding the injector 12. The injector nest 24 is moveable between a retracted or loading position (FIG. 1) through a preload position (FIG. 2) and finally to an insertion position (FIG. 3) as is herein described. An insertion or compression spring 32 is mounted in the housing 22 and connected with the second end 28 of the injector nest 24. A compressing means 34, illustrated as a piston and cylinder arrangement 36, is operable for compressing the compression spring to a loaded compressed position.

A preload spring 38 is mounted in the housing 22 and connected with the second end 28 of the injector nest 24. The preload spring 38 is used to preload, through spring force insufficient to urge the o-ring 16 into the fuel rail cup 20, the o-ring against the rim of the fuel rail cup when the injector nest 24 is released from the retracted position of FIG. 1. A retracting means 40 connected to the injector nest 24 is operable to retract the injector nest to the retracted position. Retracting means 40 may be a mechanical, pneumatic, hydraulic or electric device. The retracting means 40 retracts the insertion nest 24 against the preload spring 38 without compressing the compression spring 32.

In FIG. 1, the fuel injector 12 is supported in the support 30 of the injector nest 24. The injector nest 24 has been retracted away from its insertion position through the operation of retracting means 40 and the piston and cylinder arrangement 36 is in a retracted position of the piston. In this retracted position of the station 10, the injector 12 is in general alignment with the fuel rail cup 20.

Figure 2:
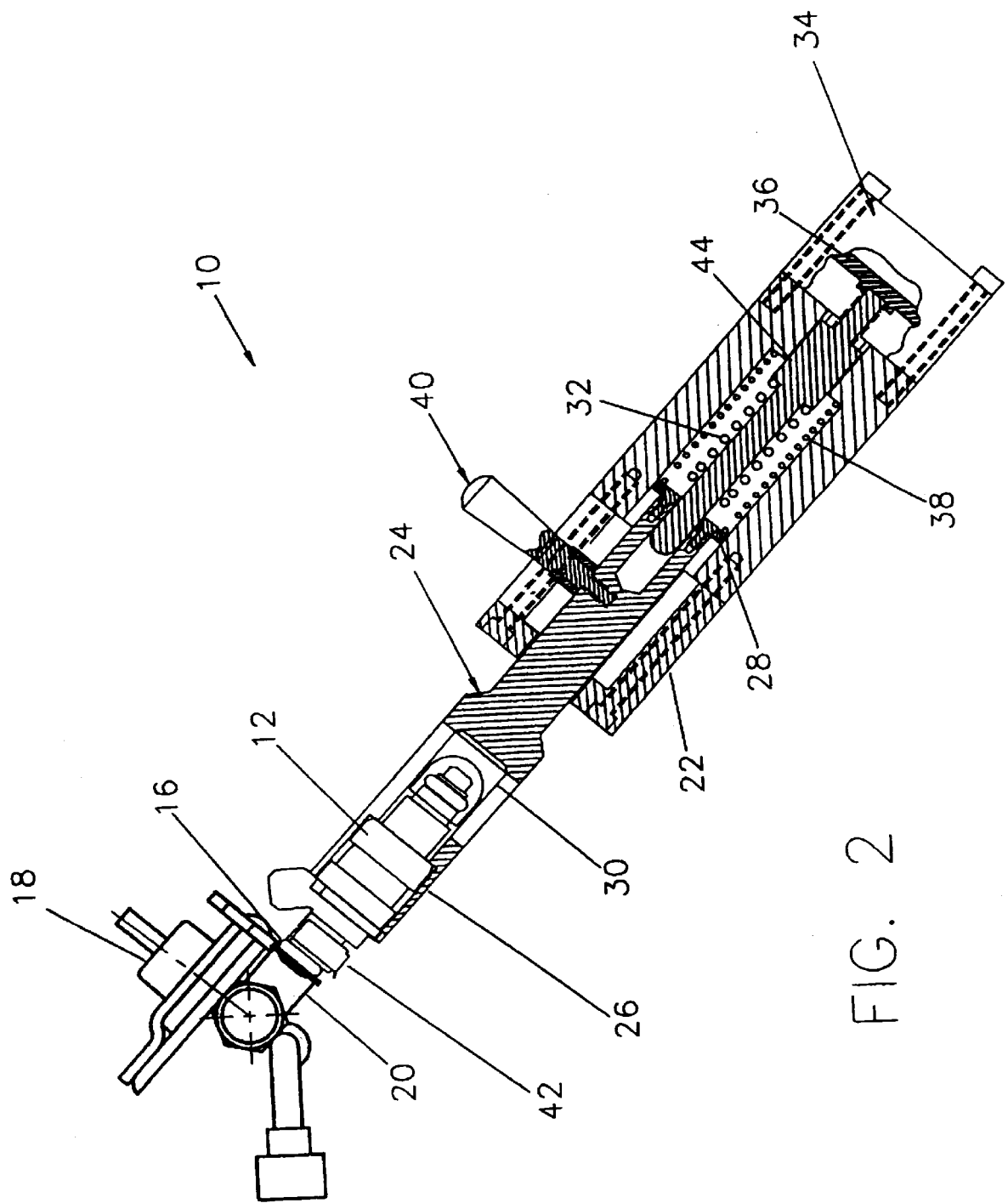
FIG. 2 is a sectional side view of the automatic injector insertion station of FIG. 1 showing a preload position of the station wherein the fuel injector is preloaded against the fuel rail cup before being assembled therein.

In FIG. 2, the retracting means 40 has been released causing the preload spring 38 to extend from a compressed state and move the injector mounting end 14 adjacent the fuel rail cup 20 preloading the injector o-ring 16 against the rim of the fuel rail cup. In this preload position, the spring force of the preload spring 38 is insufficient to urge the o-ring 16 into the fuel rail cup 20 and the station tooling is allowed to float to compensate for minor alignment shifts during the insertion cycle.

When the preload spring 38 has placed the o-ring 16 against the rim of the fuel rail cup 20, the compressing means 34 is actuated. After coming to a hard stop, the piston 36 has compressed the compression spring 32. In the embodiment illustrated, the compression spring 32 has been selected to provide a force less than that known to cause damage to the o-ring 16 during insertion. The spring force of the compression spring 32 extending from its compressed state pushes the injector mounting end 14 and o-ring 16 into a mounted position in the fuel rail cup 20 illustrated in FIG. 3.

In this mounted position, an injector clip 42 can be applied to clip the injector 12 into the fuel rail 18. The injector nest 24 thus moves by the generally linear force of the compression spring 32 from the preload position to the insertion position to assemble the fuel injector 12 and o-ring 16 into the fuel rail cup 20. Such use of the linear spring action of the compression spring 32, limits the force applied to the injector during insertion preventing damage to and or roll of the o-ring.

In the embodiment illustrated, the automatic injector insertion station 10 includes a guide 44 for guiding and supporting the compression spring 32. Guide 44 is connected to the compressing means 34 and moves therewith. The maximum movement of the o-ring 16 during installation in this application is 0.25 inches. To maintain installation force, it is preferable to have a compression spring 32 that delivers a constant force while extending the full travel of the o-ring 16.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method of inserting a fuel injector into a fuel rail cup, said fuel injector including a mounting end having an o-ring for interferingly fitting and sealing said injector in said cup, the method comprising the steps of:

aligning said mounting end for insertion into said cup;

compressing a compression spring in communication with said injector; and transmitting the spring compressive force to said fuel injector to push said injector into said fuel rail cup, urging said o-ring therein without rotation.

2. The method of claim 1 wherein compressing said compression spring includes displacing an end of said compression spring a predetermined distance.

3. The method of claim 2 wherein compressing said compression spring includes applying a pneumatic force to said spring.

4. The method of claim 2 wherein compressing said compression spring includes applying a hydraulic force to said spring.

5. The method of claim 1 further including the step of preloading said injector o-ring against said fuel rail cup to assure alignment during insertion.

6. The method of claim 5 wherein the step of preloading includes applying spring pressure insufficient to urge said o-ring into said fuel rail cup.

7. The method of claim 6 further including the step of retracting an injector nest to a loading position against preloading spring pressure without compressing said compression spring.

8. An automatic injector insertion station for inserting a fuel injector mounting end into a fuel rail cup, the injector mounting end including an o-ring for interferingly fitting and sealing said injector in said cup, said station comprising:

a housing;

an injector nest moveable relative to said housing, said nest including first and second ends, said first end including a support for supporting and guiding said injector, said injector nest being moveable between a preload position, wherein said fuel injector mounting end is adjacent said fuel rail cup, and an insertion position, wherein said mounting end and o-ring are mounted in said fuel rail cup;

a compression spring mounted in said housing and connected with the second end of said injector nest; and means for compressing said compression spring to a loaded compressed position;

whereby said injector nest is moveable by the compression spring compressive force from the preload position to the insertion position to assemble the fuel injector and o-ring into said fuel rail cup.

9. The automatic injector insertion station of claim 8 further including a guide for guiding and supporting said compression spring.

10. The automatic injector insertion station of claim 9 wherein said guide is connected to said compressing means.

11. The automatic injector insertion station of claim 10 wherein said compressing means is a pneumatic cylinder.

12. The automatic injector insertion station of claim 10 wherein said compressing means is a hydraulic cylinder.

13. The automatic injector insertion station of claim 8 further including a preload spring mounted in said housing and connected with the second end of said injector for aligning said o-ring against said fuel rail cup upon release thereof from a retracted position.

14. The automatic injector insertion station of claim 13 further including retracting means connected to said injector nest for retracting said injector nest into a loading position by compressing said preload spring without compressing said compression spring.

15. The automatic injector insertion station of claim 14 wherein said retracting means is mechanical.

16. The automatic injector insertion station of claim 15 wherein said retracting means is pneumatic.

17. The automatic injector insertion station of claim 15 wherein said retracting means is hydraulic.

18. The automatic injector insertion station of claim 15 wherein said retracting means is electrical.

* * * * *